US008484387B2

(12) United States Patent
Kim et al.

(10) Patent No.: US 8,484,387 B2
(45) Date of Patent: Jul. 9, 2013

(54) DETECTION OF CABLE CONNECTIONS FOR ELECTRONIC DEVICES

(75) Inventors: Gyudong Kim, Sunnyvale, CA (US); Chandlee Harrell, Los Altos, CA (US); Shrikant Ranade, Campbell, CA (US); Alexander Pevsakhovich, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/172,745

(22) Filed: Jun. 29, 2011

(65) Prior Publication Data
US 2012/0005377 A1   Jan. 5, 2012

Related U.S. Application Data

(60) Provisional application No. 61/360,425, filed on Jun. 30, 2010.

(51) Int. Cl.
*G06F 3/00* (2006.01)
*G06F 13/00* (2006.01)
*G06F 13/36* (2006.01)

(52) U.S. Cl.
USPC ............... 710/11; 710/8; 710/16; 710/304; 710/315

(58) Field of Classification Search
USPC ................. 710/16, 8, 11, 304, 315
See application file for complete search history.

(56) References Cited

U.S. PATENT DOCUMENTS

| 5,081,701 A | 1/1992 | Silver |
| 6,658,497 B1 | 12/2003 | Kawasaki et al. |
| 2006/0146485 A1 | 7/2006 | Stancil |
| 2008/0222703 A1* | 9/2008 | Mantani ........................... 726/3 |
| 2009/0177818 A1 | 7/2009 | Shim et al. |
| 2009/0248924 A1* | 10/2009 | Melin ............................. 710/63 |
| 2010/0283894 A1* | 11/2010 | Horan et al. ................... 348/441 |
| 2011/0208895 A1* | 8/2011 | Wiegers et al. ............... 711/103 |
| 2012/0066418 A1* | 3/2012 | Foster ............................ 710/61 |

OTHER PUBLICATIONS

Universal Serial Bus Specification, Revision 2.0, Apr. 27, 2000, pp. 17, 87, 149, 154, 244.*
USB Made Simple—Part 6, May 5, 2010, http://web.archive.org/web/20100505065839/http://www.usbmadesimple.co.uk/ums_6.htm.*
International Search Report and Written Opinion from PCT/US2011/042611 mailed Feb. 20, 2012, 7 pgs.
"High-Definition Multimedia Interface Specification Version 1.3," HDMI Licensing, LLC, Jun. 22, 2006, 237 pages.

* cited by examiner

*Primary Examiner* — Farley Abad
(74) *Attorney, Agent, or Firm* — Blakely Sokoloff Taylor Zafman LLP

(57) ABSTRACT

Embodiments of the invention are generally directed to detection of cable connections for electronic devices. An embodiment of an apparatus includes a port for the connection of a cable, the port being compatible with a first protocol and a second protocol, the port including multiple pins including a first pin for a first line and a second pin for a second line. The apparatus further includes a processor to determine a type of source device connected to the cable, where determination of the type of source device includes the apparatus detecting a low signal on the first line and a high signal on the second line, and, upon detecting the low signal on first line and the high signal on the second line, the apparatus initiates a discovery sequence, the discovery sequence including transmitting a signal sequence on the second line and attempting to receive the signal sequence on the second line. If the signal sequence is successfully received on the second line, the apparatus determines that a source device compatible with the first protocol is connected to the cable.

25 Claims, 6 Drawing Sheets

DETECTION OF CABLE CONNECTIONS FOR ELECTRONIC DEVICES

RELATED APPLICATIONS

This application is related to and claims priority to U.S. Provisional Patent Application No. 61/360,425, filed Jun. 30, 2010, and such application is incorporated herein by reference.

TECHNICAL FIELD

Embodiments of the invention generally relate to the field of electronic devices and, more particularly, to detection of cable connections for electronic devices.

BACKGROUND

As the capabilities and functions of electronic devices, and in particular mobile devices, have proliferated, there are more situations in which such devices may be connected together. Such devices may be connected together via a cable to provide various functions.

For example, a mobile device may be connected via a cable with a device in order to present data. The mobile device may contain data, such as high-definition video data, for display, and the mobile device thus may be connected to a television or other device for the purpose of displaying the data on the device.

However, there are numerous different connection protocols that may related to a device such as a television, resulting in a confusing variety of ports and connectors installed in display systems.

It is possible to utilize a connector for multiple purposes in order to minimize the number of connectors needed. However, but this may result in complications in certain circumstances. Identification of the type of device attached to an opposite end of a cable is generally required, which may result in problems if expected signals are not received. If there is difficulty in identification of connected devices, the use of pins or connections for multiple different purposes for a connector may result in the application of improper signal to devices, which may create errors or, in certain circumstances, potential damage to a device.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
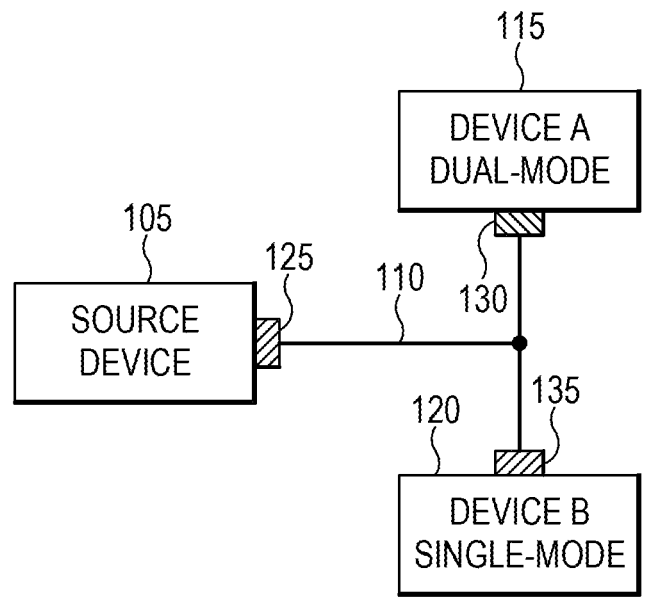
FIG. 1 is an illustration of an embodiment of detection of possible cable connections between devices.

Embodiments of the invention are generally directed to detection of cable connections for electronic devices.

In a first aspect of the invention, an embodiment of an apparatus includes a port for the connection of a cable, the port being compatible with a first protocol and a second protocol, the port including multiple pins including a first pin for a first line and a second pin for a second line. The apparatus further includes a processor to determine a type of source device connected to the cable, where determination of the type of source device includes the apparatus detecting a low signal on the first line and a high signal on the second line, and, upon detecting the low signal on first line and the high signal on the second line, the apparatus initiates a discovery sequence, the discovery sequence including transmitting a signal sequence on the second line and attempting to receive the signal sequence on the second line. If the signal sequence is successfully received on the second line, the apparatus determines that a source device compatible with the first protocol is connected to the cable.

In a second aspect of the invention, an embodiment of a method includes detecting a low signal on a first line and a high signal on a second line of a port for the connection of a cable, the port being compatible with a first protocol and a second protocol, the port including multiple pins including a first pin for the first line and a second pin for the second line. Upon detecting the low signal on first line and the high signal on the second line, the method further includes initiating a discovery sequence on the port, the discovery sequence including transmitting a signal sequence on the second line, attempting to receive the signal sequence on the second line, and, if the signal sequence is successfully received on the second line, determining that a source device compatible with the first protocol is connected to the cable.

DETAILED DESCRIPTION

Embodiments of the invention are generally directed to detection of cable connections for electronic devices.

In some embodiments, a receiving device, or sink device, operates to identify a type of transmitting device, or source device, attached to the sink device via a cable connection. The cable may be connected to a port of the sink device that is reused for multiple protocols. In some embodiments, the sink device is able to detect the type of source device even if the source device has insufficient power and thus cannot provide signaling for a discovery sequence that is normally used to identify the sink device.

In some embodiments, a cable includes a pull down resistance on a line, the resistance being tied to ground. In some embodiments, the apparatus includes a pull up device on a line that is pulled low by the resistance to ground of the cable. In some embodiments, pulling the line to low is used to generate a signal to initiate discovery of a certain type of apparatus.

In some embodiments, upon initiating a discovery sequence, a device presents a known signal, such as a pseudo random signal, on a line, where the line would unconnected in a first protocol and connected in a second protocol. In some embodiments, the device determines that an apparatus that is compatible with the first protocol is present if the signal is successfully read from the line.

Data source devices may provide data in utilizing various protocols. In an example, a device may provide video data, and in particular high-definition video data, using certain protocols, including HDMI™ (High Definition Multimedia Interface 1.4 Specification, issued May 28, 2009) and MHL™ (Mobile High-Definition Link) data protocols. MHL is an interface protocol that provides for connection of a mobile device to an HDMI display device. MHL shares a connector with USB (Universal Serial Bus) at the mobile side and shares a connector with HDMI at the display side. In this manner, neither a mobile device nor a display device requires an additional new connector to support MHL.

However, in operation a display device is required to determine if a connected source device is an HDMI source, an MHL source, or a USB device that is erroneously connected to an MHL/HDMI cable. In the interconnection of a source device to a device such as a dual-mode MHL/HDMI compatible sink, identifying the type of source device from the sink device side is important because of the state of a pin that may receive power from one of the connected devices (the pin being referred to here as the power pin). For MHL operation, power is provided by an MHL sink device to an MHL source device on the power pin. In contrast with the MHL protocol requirements, a voltage is supplied on the power pin in the reverse direction in an HDMI connection, from the HDMI source device to a connected HDMI sink device.

The provision of the power signal from the MHL sink device to the MHL source device enables the sink device (being a display device) to provide power to charge the battery of the source device (being a mobile device that is generally running on battery power).

However, a battery drained mobile device cannot initiate the discovery sequence provided for MHL protocol, and a successful discovery sequence is necessary for subsequent MHL operations. In some embodiments, if a sink device can identify a discharged source device, it is possible to charge the source unit without the requirement of proceeding through the discovery sequence. If a sink device were instead designed such that power was available all times, then the source device would not need to be identified. However, this implementation would create certain complications, including:

(1) The constant provision of power increases the stand-by power requirements of the display device.

(2) Because of the sharing of MHL and HDMI connectors at the sink device end, the provision of power on the power pin creates a power conflict when the display device is connected with a legacy HDMI source device, which would normally supply power on this pin.

FIG. 1 is an illustration of an embodiment of detection of possible cable connections between devices. In some embodiments, a data source device such as a source device 105 is connected via a cable 110 to a data sink device. In some embodiments, the cable 110 utilizes connectors for ports that are reused for multiple protocols. For example, the port at the source device end 125 may be an MHL port, which is a reused USB port. Further, the port at the sink end of the cable 110 could be an HDMI port, such as port 135 of Device B 120, a single-mode HDMI device, or an MHL port, such as port 130 of Device A 115, a dual-mode HDMI/MHL device. (While FIG. 1 illustrates device 105 as being connected to Device A and Device B, this is intended as an alternative, and not an indication that device 105 is connected to both simultaneously.)

In this illustration, if the cable is connected to Device A 115, then it is not apparent simply from the connection of the cable what type of device the source device 105 might be. The source device could be an HDMI device, an MHL device, or an incorrectly connected USB connection (in which an MHL cable is incorrectly plugged into a USB port of a non-MHL device).

A protocol related to source device 105 often will include a discovery process to be followed when devices are connected. For example, MHL protocol includes a discovery sequence for the connection of an MHL sink device and source device. However, the discovery sequence requires the operation of the MHL mobile device, which will not be possible if the MHL mobile device is running battery power and the battery is discharged to a level that is too low to run the device. In some embodiments, Device A provides for determination of the type of device Source Device 105 is without the Source Device having sufficient power to complete the discover process for MHL. In some embodiment, upon discovering that the Source Device is an MHL compatible device, Device A 115 provides power to a pin of the connector 130 to charge the battery of Device A 115.

Figure 2:
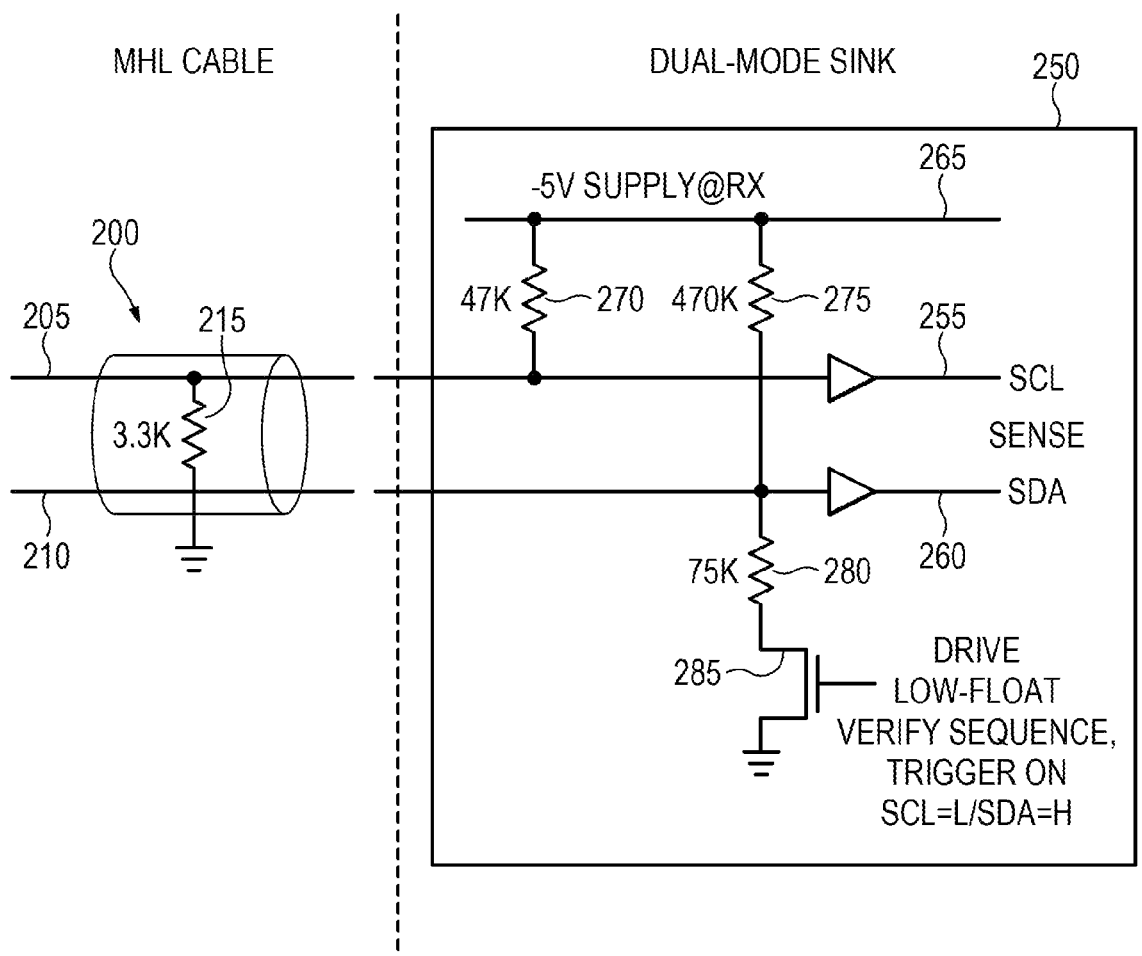
FIG. 2 is an illustration of an embodiment of a cable and sink device.

FIG. 2 is an illustration of an embodiment of detection of a source device. In this illustration, a cable includes a plurality of lines, including connection to the SCL line (the $I^2C$ serial clock) for the DDC (Display Data Channel) for HDMI) and the SDA line (the $I^2C$ serial data line for the DDC). In some embodiments, the cable includes a pull-down resistor at SCL pin in the cable. For the sink device, SCL will stay high due to a required pull-up resistor when nothing is connected to the line. In some embodiments, when an MHL/HDMI cable is plugged into the connector, the resistor in the cable pulls SCL down, while not affecting SDA. SDA is pulled up by additional circuitry required for a MHL/HDMI dual mode receiver.

In some embodiments, if it is determined that (SCL==low) & (SDA==high), the sink device may attempt to drive the SDA line low through the 75 KΩ resistor. If SDA can be pulled low, this may verify that there is no powered HDMI source connected. In some embodiments, instead of only driving SDA low, a signal, such as a pseudo-random sequence, is used to improve reliability of detection of attached devices.

In this illustration, a cable, such as MHL cable 200, is connected to a sink device, shown as dual-mode sink 250. As illustrated, the cable includes multiple connections, including for example connections 205 and 210, which are connected to SCL 255 and SDA 260 sense connections. The SCL and SDA pins are not active in MHL. In some embodiments, the cable 200 includes a pull down resistance 215, illustrated here as a 3.3 KΩ resistance to ground.

As shown in FIG. 2, the sink device 250 includes a pull up device 270 that is connected to SCL 255, where the resistance is shown as a required 47 KΩ resistance to power supply 265 (VCC). The sink device 250 further includes a resistance 275, shown as 470 KΩ resistance, coupled between the SDA line and power supply 265, and a resistance 280 (75 KΩ resistance) and transistor device 285 between the SDA line 260 and ground.

Before the cable 200 is connected, the sink device 250 will detect a High value at SCL and SDA. In some embodiments, when the cable 200 is connected, the pull down resistance 215 will pull the voltage of SCL down to Low, while having no effect on SDA. In some embodiments, detection of SCL=Low and SDA=High initiates a process for discovery of an MHL device. In some embodiments, the sink device then presents a signal such as a pseudo random sequence (PRS) to the SDA line, and attempts to read the PRS from the SDA. In some embodiments, if the PRS is detected on SDA then this that indicates other signals are not being driven on the line, which would occur with an HDMI device, and thus the connection is to an MHL device.

Figure 3:
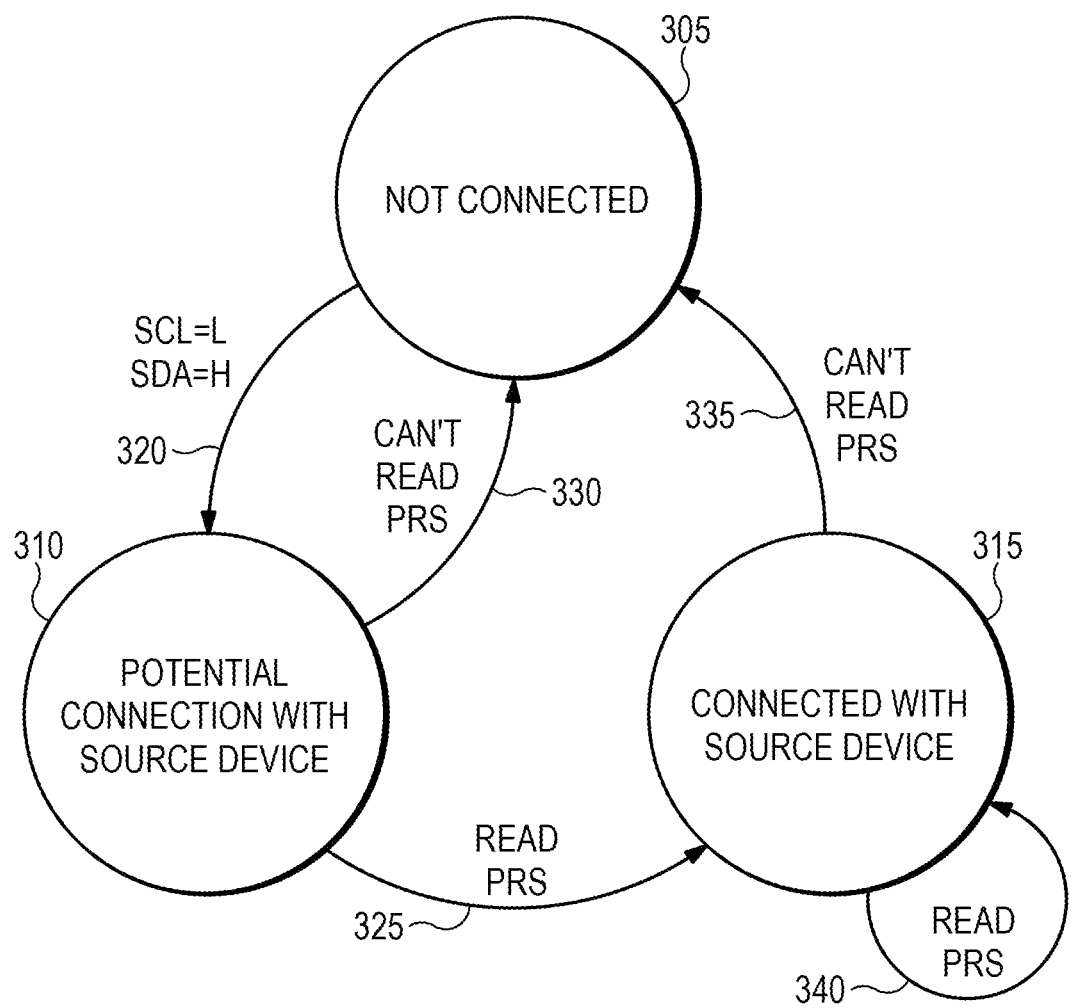
FIG. 3 is a state diagram illustrating the discovery of a device connected to another device via a cable connection.

FIG. 3 is a state diagram illustrating the discovery of a device connected to another device via a cable connection.

The sensing device originally is in a state shown as "Not Connected" 305, indicating that a connection to a protocol device (such as an MHL compatible device) has not been detected. Upon detecting SCL=Low and SDA=High 320, the device may enter a state for "Potential Connection with Source Device" 310. In this state, the sink device begins transmitting a signal (PRS in this illustration) on the SDA line.

If the PRS is not successfully read from the SDA line 330, then the device returns to "Not Connected" state 305. If the PRS is successfully read from the SDA line 325, then the sink device enters a state for "Connected with Source Device" 315.

While in the connected state, the sink device continues to write the PRS to the SDA line. If the PRS is successful read 340, the state remains as Connected 315. If not 335, the device returns to the "Not Connected" state 305.

Figure 4:
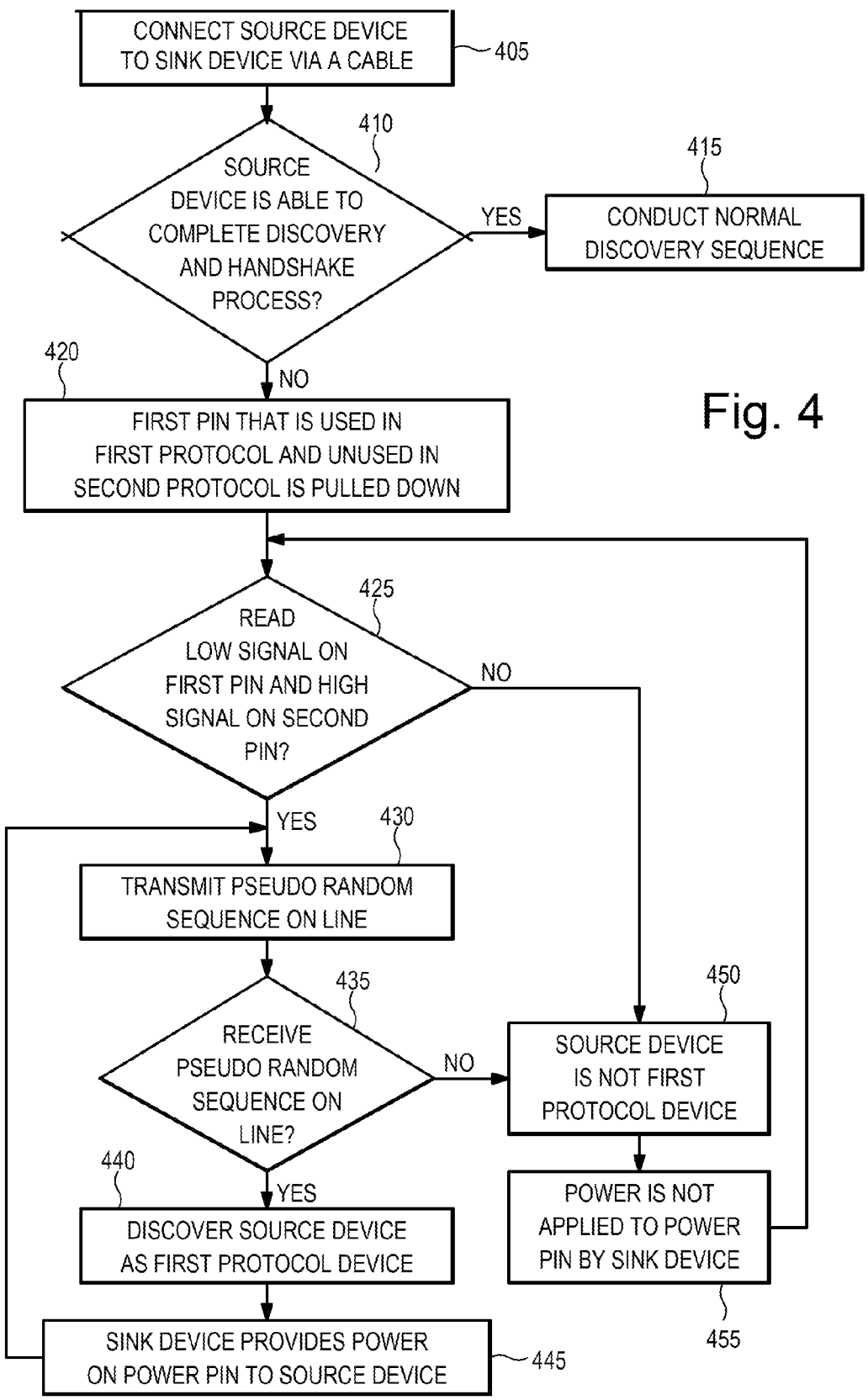
FIG. 4 is a flow chart to illustrate a process for detecting a source device connected to a sink device.

FIG. 4 is a flow chart to illustrate a process for detecting a source device connected to a sink device. In this illustration, a source device is connected to a sink device via a cable 405. If the source device is able to complete the discovery and handshake process for a first protocol (such as MHL) 410, then the normal discovery sequence is followed 415.

In some embodiments, if the normal discovery process is not possible, such as in a circumstance in which the source device has a dead battery, then a voltage potential of a first line (which is not used in the first protocol but is used in a second protocol, such as SCL) may be pulled down 420, such as by a resistance to ground provided by the cable.

In some embodiments, if the sink device does not detect a low value on the first line and a high value on a second line 425 (such as SDA), then the source device is not detected to be a first protocol device 450, and no power is applied to a power pin by the sink device 455. However, if the sink device reads a low value on the first pin and a high value on a second pin, then the sink device proceeds to transmit a signal, such as a pseudo random sequence (PRS), on the second line 430 to determine whether a device of the first protocol is connected to the cable.

If the PRS is detected on the second line 435, then the source device is detected as a first protocol device 440, and the sink device may provide power on a power pin 445. However, if the PRS is not detected on the second line, then the source device is not a first protocol device 450, and no power is applied to a power pin by the sink device 455.

Figure 5:
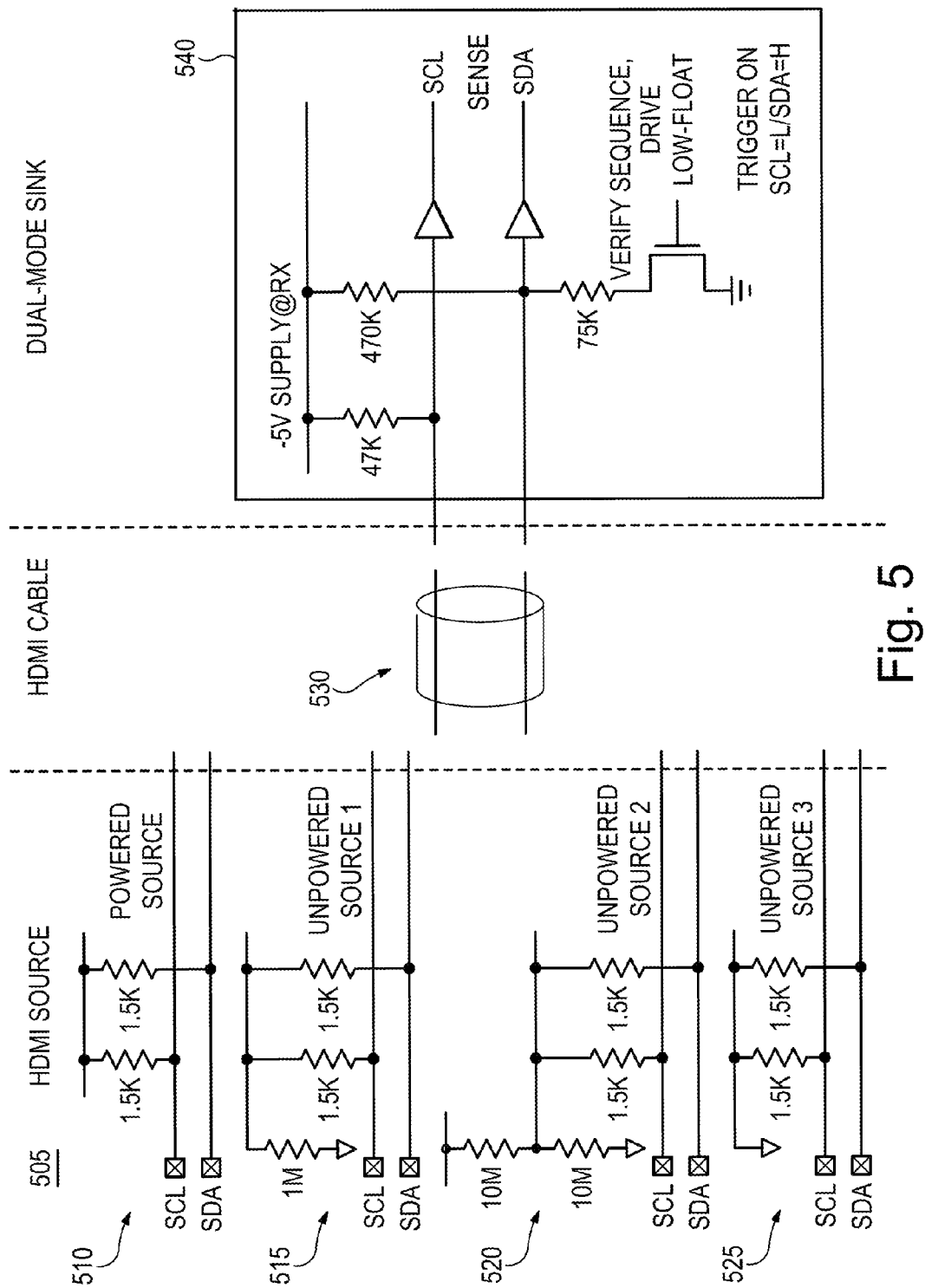
FIG. 5 is an illustration of an embodiment of detection of certain states of a source device connected to a sink device.

FIG. 5 is an illustration of an embodiment of detection of certain states of a source device connected to a sink device. A dual-mode sink device may encounter a source device utilizing a certain protocol (an HDMI device in this illustration) that may be in differing states depending on the current circumstances. In some embodiments, the sink device differentiates the source device from another type of source device (an MHL device) in each of the states based on the signals detected on connected lines, such as the SCL and SDA lines illustrated in FIG. 2 as elements 255 and 260.

In this illustration, an HDMI source 505 is connected via an HDMI cable 530 to a dual-mode sink device 540, the dual-mode sink being compatible with multiple protocols, such protocols here being HDMI and MHL.

In a first state 510, the HDMI source 505 is connected to a power source, with pull up resistors from the SCL and SDA lines. In this case, the DDC (Display Data Channel) may be active and the signals on SCL and SDA may transition through High and Low states. In some embodiments, the sink device 540 may require that SCL remain Low and SDA remain High for a certain time period (the time period being based on I²C clock requirements) before beginning a discovery sequence. In some embodiments, whether or not SCL=Low and SDA=High for any time period, the transmission of a signal such as a pseudo random sequence on the SDA will determine that the source is not an MHL source device because such sequence will not be readable on the SDA line.

In a second state 515, the HDMI source device 505 is not powered, with the shut off resulting in a high impedance to ground. As a result, there is a relative short (through the low resistance pull up resistors) between SDA and SCL. In some embodiments, the sink device 540 will detect SDA and SCL as both High, and thus will not initiate a discovery sequence.

In a third state 520, the power supply is powered off, but, because of a leakage condition, there appears to be a high impedance connection to the power supply as well as the high impedance connection to ground. In some embodiments, the sink device 540 will generally detect SDA and SCL as both High, and thus will not initiate a discovery sequence. However, if the values float such that SCL appears low and SDA appears high, the verify sequence will not be readable on SDA, and the HDMI source device 505 will not be detected as an MHL device.

In a fourth state 525, the power supply is powered off, but this then results in a low impedance connection/short to ground. In some embodiments, the sink device 540 will then detect both SCL and SDA as Low, and thus will not initiate a discovery sequence for the HDMI source device 505.

Figure 6:
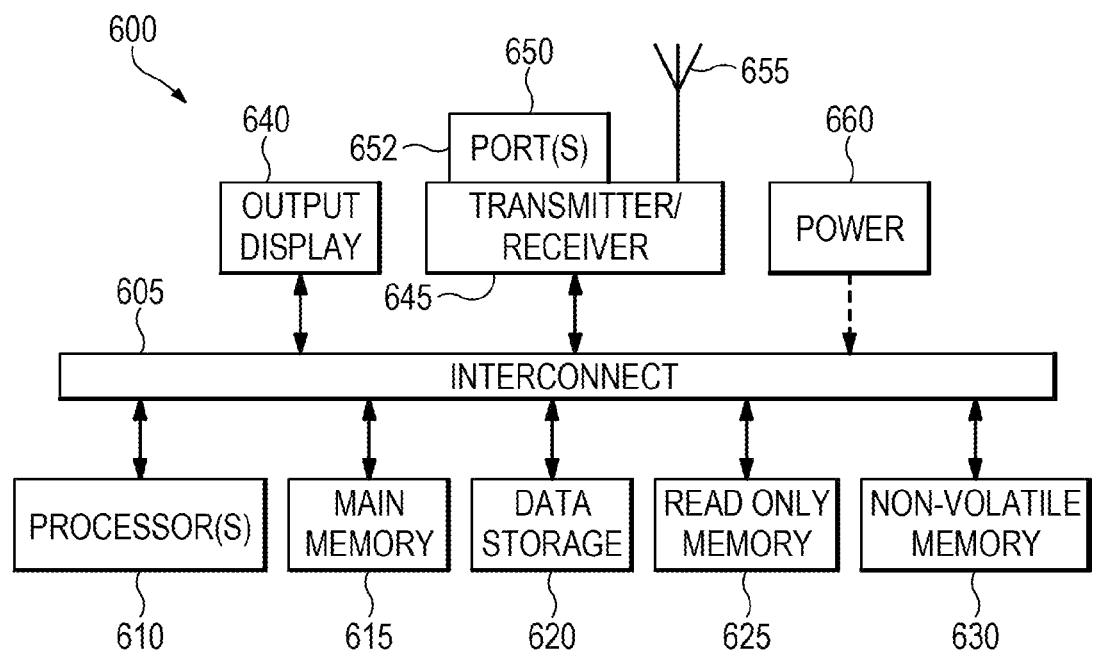
FIG. 6 illustrates an embodiment of an electronic device.

FIG. 6 illustrates an embodiment of an electronic device. In this illustration, certain standard and well-known components that are not germane to the present description are not shown. Under some embodiments, the device 600 comprises an interconnect or crossbar 605 or other communication means for transmission of data. The data may include various types of data, including, for example, audio-visual data and related control data. The device 600 may include a processing means such as one or more processors 610 coupled with the interconnect 605 for processing information. The processors 610 may comprise one or more physical processors and one or more logical processors. Further, each of the processors 610 may include multiple processor cores. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers. The interconnect 605 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 600 further comprises a random access memory (RAM) or other dynamic storage device as a main memory 615 for storing information and instructions to be executed by the processors 610. Main memory 615 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 600 also may comprise a read only memory (ROM) 625 or other static storage device for storing static information and instructions for the processors 610. The device 600 may include one or more non-volatile memory elements 630 for the storage of certain elements.

Data storage 620 may also be coupled to the interconnect 605 of the device 600 for storing information and instructions. The data storage 620 may include a magnetic disk or other memory device. Such elements may be combined together or may be separate components, and utilize parts of other elements of the device 600.

The device 600 may also be coupled via the interconnect 605 to an output display or presentation device 640. In some embodiments, the display 640 may include a liquid crystal display (LCD or any other display technology, for displaying information or content to an end user. In some environments, the display 640 may include a touch-screen that is also utilized as at least a part of an input device. In some environments, the display 640 may be or may include an audio device, such as a speaker for providing audio information, including the audio portion of a television program.

One or more transmitters or receivers 645 may also be coupled to the interconnect 605. In some embodiments, the device 600 may include one or more ports 650 for the reception or transmission of data. In some embodiments, the device 600 will detect a type of source device connected to a port based on the signals detected on connected lines.

The device 600 may further include one or more antennas 655 for the reception of data via radio signals. The device 600 may also comprise a power device or system 660, which may comprise a power supply, a battery, a solar cell, a fuel cell, or other system or device for providing or generating power. The power provided by the power device or system 660 may be distributed as required to elements of the device 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
a port for the connection of a cable, the port being compatible with a first protocol and a second protocol, the port including a plurality of pins including a first pin for a first line, a second pin for a second line, and a third pin that is a power pin; and
a processor to determine a type of source device connected to the cable, where determination of the type of source device includes:
determining by the apparatus whether the source device is able to complete a discovery and handshake process under a first protocol,
if the source device is not able to complete the discovery and handshake process under the first protocol, the apparatus detecting a value of a signal on the first line and a value of a signal on the second line,
upon detecting a low signal on first line and a high signal on the second line, the apparatus is to initiate a discovery sequence, the discovery sequence including:
transmitting a signal sequence on the second line;
attempting to receive the signal sequence on the second line;

upon successfully receiving the signal sequence on the second line, the apparatus is to determine that a source device compatible with the first protocol is connected to the cable and to supply a power signal on the power pin to the source device; and upon failing to receive the signal sequence on the second line, the apparatus is to determine that a source device compatible with the first protocol is not connected to the cable and to apply no power to the power pin.

2. The apparatus of claim 1, wherein the first protocol is MHL (Mobile High-Definition Link) and the second protocol is HDMI (High Definition Multimedia Interface).

3. The apparatus of claim 2, wherein the first line is an SCL line for a DDC (Display Data Channel) communication channel.

4. The apparatus of claim 2, wherein the second line is a SDA line for a DDC (Display Data Channel) communication channel.

5. The apparatus of claim 1, wherein the cable includes a pull down resistance for the first line.

6. The apparatus of claim 1, wherein the signal sequence is a pseudo random signal sequence.

7. The apparatus of claim 1, further comprising a first pullup resistor coupled to the first line and a second pullup resistor coupled to the second line.

8. The apparatus of claim 1, wherein a source device that is detected using the detection sequence is a device compatible with the first protocol, the source device having a battery without sufficient power when the source device is connected to the cable to allow completion of the discovery and handshake process for the first protocol.

9. The apparatus of claim 1, wherein the second protocol requires that the source device supply a voltage on the power pin.

10. The apparatus of claim 1, wherein upon the apparatus determining that the source device compatible with the protocol is connected to the cable and supplying the power signal on the power pin to the source device, the apparatus determining again whether the source device is able to complete the discovery and handshake process under the first protocol.

11. A method comprising:
determining by whether a source device connected by a cable to a port is able to complete a discovery and handshake process under a first protocol, the port being compatible with the first protocol and a second protocol;
upon determining that the source device is not able to complete the discovery and handshake process under the first protocol, detecting a state of a signal on a first line and a signal on a second line of the port for the connection of the cable, the port including a plurality of pins including a first pin for the first line, a second pin for the second line, and a third pin that is a power pin; and
upon detecting the low signal on first line and the high signal on the second line, initiating a discovery sequence on the port, the discovery sequence including:
transmitting a signal sequence on the second line,
attempting to receive the signal sequence on the second line,
upon successfully receiving the signal sequence on the second line, determining that a source device compatible with the first protocol is connected to the cable and supplying a power signal on the power pin to the source device, and
upon failing to receiver the signal sequence on the second line, determining that a source device compatible with the first protocol is not connected to the cable and applying no power to the power pin.

12. The method of claim 11, wherein the first protocol is MHL (Mobile High-Definition Link) and the second protocol is HDMI (High Definition Multimedia Interface).

13. The method of claim 12, wherein the first line is an SCL line for a DDC (Display Data Channel) communication channel and the second line is a SDA line for the DDC communication channel.

14. The method of claim 11, wherein the cable includes a pull down resistance for the first line.

15. The method of claim 11, wherein transmitting the signal sequence comprises transmitting a pseudo random signal sequence.

16. The method of claim 11, wherein upon determining that the source device compatible with the protocol is connected to the cable and supplying the power signal on the power pin to the source device, determining again whether the source device is able to complete the discovery and handshake process under the first protocol.

17. A system comprising:
a sink device, the sink device including a port for the connection of a cable, the port being compatible with a first protocol and a second protocol, the port including a plurality of pins including a first pin for a first line, a second pin for a second line, and a third pin that is a power pin, the sink device to determine a type of source device connected to the cable, wherein determination of the type of source device includes:
the sink device determining whether the source device is able to complete a discovery and handshake process for the first protocol,
upon determining that the source device is not able to complete the discovery and handshake process under the first protocol, the sink device detecting a value of a signal on the first line and a value of a signal on the second line, and
upon detection of a low signal on first line and a high signal on the second line, the sink device initiating a discovery sequence, the discovery sequence including transmitting a signal sequence on the second line and attempting to receive the signal sequence on the second line; and
a cable for connection with the port, the cable including a connector having a plurality of pins including a first pin to connect with the first pin of the port, a second pin to connect with a second pin of the port, and a third pin to connect with the power pin, wherein the cable includes a pull-down resistor coupled with the first pin of the cable connector;
wherein, upon the sink device successfully receiving the signal sequence on the second line, the sink device is to determine that a source device compatible with the first protocol is connected to the cable and to supply a power signal on the power pin to the source device;
wherein, upon the sink device failing to receive the signal sequence on the second line, the sink device is to determine that a source device compatible with the first protocol is not connected to the cable and to apply no power to the power pin.

18. The system of claim 17, wherein the first protocol is MHL (Mobile High-Definition Link) and the second protocol is HDMI (High Definition Multimedia Interface).

19. The system of claim 18, wherein the first line is an SCL line for a DDC (Display Data Channel) communication channel.

20. The system of claim 18, wherein the second line is a SDA line for a DDC (Display Data Channel) communication channel.

21. The system of claim 17, wherein the signal sequence is a pseudo random signal sequence.

22. The system of claim 17, the sink device further comprising a first pullup resistor coupled to the first line and a second pullup resistor coupled to the second line.

23. The system of claim 17, wherein the source device includes a battery that does not have sufficient power when the source device is connected to the cable to allow completion of the discovery and handshake process for the first protocol.

24. The system of claim 17, wherein the second protocol requires that the source device supply a voltage on the power pin.

25. The system of claim 17, wherein upon the sink device determining that the source device compatible with the protocol is connected to the cable and supplying the power signal on the power pin to the source device, the sink device determining again whether the source device is able to complete the discovery and handshake process under the first protocol.

\* \* \* \* \*

UNITED STATES PATENT AND TRADEMARK OFFICE
CERTIFICATE OF CORRECTION

| | |
|---|---|
| PATENT NO. | : 8,484,387 B2 |
| APPLICATION NO. | : 13/172745 |
| DATED | : July 9, 2013 |
| INVENTOR(S) | : Gyudong Kim et al. |

It is certified that error appears in the above-identified patent and that said Letters Patent is hereby corrected as shown below:

On the Title Page

Item (75) the spelling of the fourth inventor's last name should be corrected from "Pevsakhovich" to -- Peysakhovich --.

Signed and Sealed this
Third Day of September, 2013

Teresa Stanek Rea
*Acting Director of the United States Patent and Trademark Office*